G. J. Caperrell,
Button.

No 3307. Reissued Feb 23, 1869.

Witnesses.
Albert W. Brown,
H. L. Wattenberg

Inventor.
G. J. Caperrell
by Wm. Simpson
Atty.

THE NORRIS PETERS CO., WASHINGTON, D. C.

United States Patent Office.

GEORGE J. CAPEWELL, OF WEST CHESHIRE, CONNECTICUT.

*Letters Patent No.* 62,001, *dated February* 12, 1867: *reissue No.* 3,307, *dated February* 23, 1869.

IMPROVEMENT IN BUTTON-FASTENINGS.

The Schedule referred to in these Letters Patent and making part of the same.

*To all whom it may concern:*

Be it known that I, GEORGE J. CAPEWELL, of West Cheshire, in the county of New Haven, and State of Connecticut, have invented a new and useful "Improvement in the Construction and Manufacture of Buttons;" and I do hereby declare the following to be a full and exact description of the same, reference being had to the drawings which accompany and form a part of this specification.

The object of the present invention is to construct buttons in such manner that, without sewing or stitching, they can be readily attached to textile or other fabrics, leather, or other material suitable to receive them.

And, by the present invention for the object stated, a button is made in two parts—the one, the button proper, and the other the shank, which is then the fastening-device; or, the one, the button proper, and shank in one piece, and the other the fastening device, that are, relatively, so constructed, that while such parts, when placed, the one upon the other, in a proper manner, and power, or force is applied, will become firmly, strongly, and rigidly secured, or fastened together by my improved construction. When the button is applied to cloth, leather, &c., it extends entirely through it, from one side to the other; and when fastened, or secured, as before stated, confines the cloth between the outer and inner ends of the button and its fastenings.

In the accompanying plate of drawings, my "improvement in the construction of buttons" is illustrated—

Figure 1:
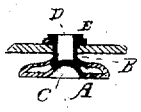

Figure 1 being a central section through a button constructed thereto, showing its two parts fastened together in a piece of cloth, with a washer upon one side of the cloth.

Figure 2:
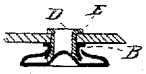

Figure 2, a similar sectional view to that of fig. 1, but showing the button without the washer.

Figure 3:
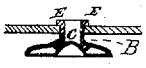
Figure 4:
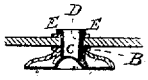

Figures 3 and 4, similar sectional views to the figs. 1 and 2, preceding, showing, however, a modification in the construction and application of the button, to be hereinafter particularly described, the one without, and the other with a washer.

Figure 5:
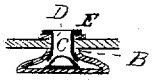

Figure 5, a similar sectional view of a button to the figures preceding, showing a modification in the construction of it.

Figure 6:
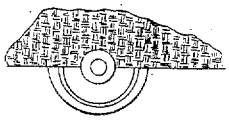

Figure 6, a plan view of the button upon its inner, or rear end.

Figure 7:
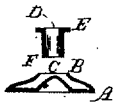

Figure 7, a sectional view of the two parts to a button, constructed according to my invention, before attached, or secured together.

Figure 8:
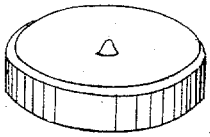

Figure 8, a perspective view of a combined bodkin and die, or punch, for securing my buttons to cloth, &c.

Figure 9:
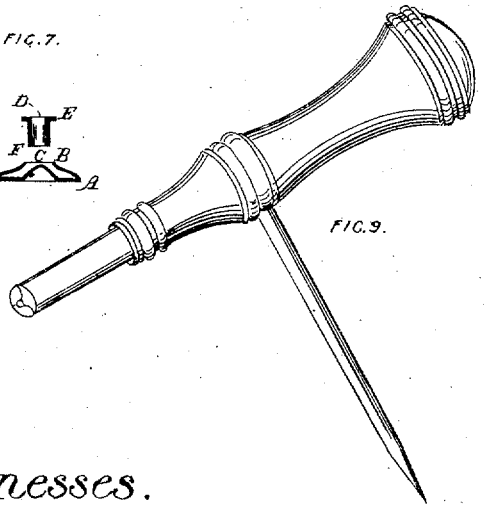

Figure 9, a perspective view of a bed-piece, or anvil-block, adapted for use, in connection with the punch, or die shown in the preceding figure, to fasten the two parts of the button together.

A, in the drawings, represents the front plate of a button, or the button proper, which, in the present instance, is shown as made hollow, and upon its rear side, open at the centre B, at which point the front plate A, of the button, upon its inner face, is shown as made or provided with a conical-shaped teat, or protuberance, C.

D, the shank, or fastening-part of the button, which shank D is of the form of an eyelet, with a flange, E, at one end.

To attach the two parts, A and D, of the button together, the open end F, of the eyelet-shank D, is placed within the opening B, of the button proper, A, resting, by its end, against the conical teat C thereof, when, by applying force, power, or pressure to the outer, or flanged end E, of the eyelet-shank D, the end of the eyelet within the button proper, is, by the cone-teat, made to spread out within the button proper, beyond the edges of its openings B, thus effecting the fastening and securing of the two together, and in a most rigid, firm, and strong manner.

In the several figures of the drawings, this fastening together of the two parts of the button is shown in connection with a piece of cloth, through which the eyelet-shank is first passed before the button proper is fastened to it, as has been just above described, if it is desired to apply the button thereto.

For facilitating this insertion of the eyelet-shank in the cloth, a hole is first made in it with the bodkin, shown in fig. 9.

If increased protection from injury to the cloth is desired, or necessary, a washer may be used upon the eyelet-shank, under its flange-end, between it and the cloth, as shown in figs. 4, 5, and 6.

For forcing the eyelet-shank within the button proper, the die, or punch, *h*, shown in fig. 8 of the drawings, is used in the flanged-end of the eyelet; and, in using the said die, care should be taken to observe that the end of the eyelet-shank, within the button proper, first sets rightly, or "squarely," as it were, upon the cone therein, so that an even swaging, or spreading out of the eyelet can be secured. And also, care must be taken to observe whether the eyelet-shank has been swaged or spread, within the button proper, to form a flange of a sufficient extent to insure the holding together of the two parts of the button, or otherwise the buttons will be liable to rip, or break off, or apart.

By pressing or forcing the eyelet into the button proper with a greater or lesser amount of force, it is obvious that less or more space, between the back of the button and the cloth, will be left, and this, of course, is to be regulated according to the circumstances of each particular case where the buttons are applied and are to be employed In the buttons shown in figs. 2 and 4, two eyelets, the one within the other, are there shown as employed the object being to give firmness and stiffness to the shank. And, by using an inner eyelet of a greater length than the outer one, with the cloth between their flanged ends, sufficient space is secured for the buttoning-cloth to be buttoned over the buttons.

In fig. 5, the form there shown is suitable for being covered with cloth, the front of the button proper being made of two thicknesses of sheet-metal, with the outer one plane, and the inner one provided with a cone-teat, or protuberance, as shown, for producing the swaging, or spreading of the eyelet-shank within the button proper.

In the several figures of the drawings, the buttons there shown, are made or supposed to be made of sheet-metal; but, in lieu of sheet-metal, other materials, such as horn, ivory, vulcanized India rubber, or gutta-percha, cast-metal, or any other substance or substances, either singular, or compounded together, that may be suitable or proper for use as buttons may be employed; and at the centre of such button-material, the conical teat, or protuberance, is made for producing the spreading of the shank within it when the two are attached together.

And, in lieu of having the shank independent of the button proper, as has been hereinabove described, the shank and button proper may form one part, and then, over the end of the shank, a plate, or disk fastened in the same manner as that described for fastening the button proper to the shank, and by means of a similar, or equivalent interior construction of the said disk, or plate, that, when force is applied to the eyelet, or to the said disk, will allow or cause such eyelet to be spread out, or swaged around, within the said disk, beyond the edges of its opening, made to receive the end of the eyelet-shank; the operation, effect, and principle being the same, in this instance, as in the construction of the button proper fastening the shank in it; the only difference being, that in lieu of the button proper, or plate being the one thus fastened, it is a plate, or disk-back of the button or cloth.

And it may be here remembered, that, in the manufacture of the button proper, or head, or plate, *a*, any of the modes now in general use or practice may be employed, the present invention not relating, in any manner, to the mode of producing a button, but simply to its construction relatively to a fastening-device for securing it to cloth, &c., without stitching, or securing.

Having thus described my improvement,

What I claim as my invention, is

1. A button, or button-head, having a recess of inverted-cone form, made in its inner side, to receive an eyelet, or hollow shank, or tube, which, when pressed into said conical recess, will expand radially, and be firmly connected to the button, and, at the same time, secure the button to the garment, or fabric, substantially as described.

2. The combination of an eyelet, or hollow shank, with a cone *c*, or its equivalent, either with or without a washer, substantially as and for the purpose specified.

3. The combination of two or more eyelets, with the cone C, or its equivalent, of a button, and either with or without a washer, when arranged and combined for action, and for fastening the cloth, &c., between their two ends, substantially as specified.

GEORGE J. CAPEWELL.

Witnesses:

EDW'D A. CORNWALL,

THOMAS E. CORNWALL.